(12) United States Patent
Hirabayashi

(10) Patent No.: US 7,336,057 B2
(45) Date of Patent: Feb. 26, 2008

(54) DC/DC CONVERTER

(75) Inventor: Nobuo Hirabayashi, Aichi (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/412,818

(22) Filed: Apr. 26, 2006

(65) Prior Publication Data

US 2006/0244430 A1 Nov. 2, 2006

(30) Foreign Application Priority Data

Apr. 27, 2005 (JP) .......................... P2005-130283

(51) Int. Cl.
*G05F 1/00* (2006.01)

(52) U.S. Cl. ................. 323/266; 323/222; 323/223; 323/224; 323/282; 363/16; 363/17; 363/20; 363/21.02; 363/21.03; 363/21.04; 363/21.05; 363/21.07; 363/41; 363/83

(58) Field of Classification Search .......... 323/22–224, 323/266, 282; 363/16–17, 20–21, 21.02, 363/41, 83, 21.03, 21.04, 21.05, 21.07
See application file for complete search history.

(56) References Cited

U.S. PATENT DOCUMENTS

| 4,866,367 | A | * | 9/1989 | Ridley et al. ................. 323/287 |
| 5,051,880 | A | * | 9/1991 | Harm et al. ..................... 363/49 |
| 5,347,442 | A | * | 9/1994 | Henmi et al. ................... 363/41 |
| 5,745,351 | A | * | 4/1998 | Taurand ........................ 363/20 |
| 5,912,552 | A | * | 6/1999 | Tateishi ....................... 323/285 |
| 5,959,850 | A | * | 9/1999 | Lim ............................ 363/17 |
| 6,069,804 | A | * | 5/2000 | Ingman et al. ............ 363/21.14 |
| 6,069,807 | A | * | 5/2000 | Boylan et al. ................. 363/97 |
| 6,151,222 | A | * | 11/2000 | Barrett ........................ 363/16 |
| 6,317,341 | B1 | * | 11/2001 | Fraidlin et al. .......... 363/56.09 |
| 6,344,980 | B1 | * | 2/2002 | Hwang et al. ........... 363/21.01 |
| 6,385,059 | B1 | * | 5/2002 | Telefus et al. ........... 363/21.15 |
| 6,396,725 | B1 | * | 5/2002 | Jacobs et al. ................ 363/131 |
| 7,187,144 | B2 | * | 3/2007 | Nakayama ................... 318/139 |
| 2001/0024373 | A1 | * | 9/2001 | Cuk ............................ 363/16 |
| 2005/0219866 | A1 | * | 10/2005 | Shimada ....................... 363/16 |

FOREIGN PATENT DOCUMENTS

JP 9-240422 9/1997

* cited by examiner

*Primary Examiner*—Bao Q. Vu
*Assistant Examiner*—M'baye Diao
(74) *Attorney, Agent, or Firm*—Morgan & Finnegan, L.L.P.

(57) ABSTRACT

A DC/DC converter includes: a boost converter that boosts an input voltage in accordance with a first control signal; an insulated converter that converts an output of the boost converter in accordance with a second control signal; a current sensor that detects an output current of the insulated converter; a first controller that generates the first control signal based on an error between the output current detected by the current sensor and a first threshold value; and a second controller that generates the second control signal based on an error between the output current detected by the current sensor and a second threshold value that is larger than the first threshold value.

2 Claims, 7 Drawing Sheets

CURRENT ERROR
AMPLIFIER CURRENT

DC/DC CONVERTER

FIELD

The present invention relates to a DC/DC converter having a current limiting function.

BACKGROUND

Conventional DC/DC converters are commonly used in various fields, and a boost DC/DC converter is known as one type of DC/DC converter.

FIG. 9 shows the configuration of a main part of a general boost DC/DC converter. The boost DC/DC converter (hereinafter referred to as "boost converter") 100 of FIG. 9 boosts an input voltage Vin that is supplied from a DC power source 201 and supplies a boosted voltage to a load 202.

The boost DC/DC converter 100 is provided with an input capacitor C1, an inductor L1, a transistor T1, a diode D1, and an output capacitor C2. Operating as a switching device, the transistor T1 controls a current flowing through the inductor L1 according to a PWM signal that is supplied from a control circuit (not shown). The inductor L1 transmits power from the DC power source 201 to the output side according to an on/off operation of the transistor T1. The diode D1 is provided for rectification. The control circuit (not shown) controls the transistor T1 so that the output voltage is kept at a prescribed value. As a result, a voltage required by the load 202 is generated. The boost converter having the above configuration is described in JP-A-9-240422 (on FIG. 1 and paragraphs [0022]-[0024]).

Among DC/DC converters is one having a current limiting function of controlling the output current or the load current so that it does not exceed a prescribed threshold value. In the boost converter 100 shown in FIG. 9, the current limiting function can be realized by monitoring the output current and controlling the transistor T1 so that the output current does not exceed a prescribed threshold value. In this case, as shown in FIG. 10, when the output current has increased to a threshold value Ir, the operation mode is switched from a voltage control mode to a current limiting mode. In the current limiting mode, the current is limited by decreasing the output voltage.

However, in the boost converter 100 shown in FIG. 9, the input and the output are not insulated from each other but always connected to each other via the diode D1. Therefore, the output voltage cannot be decreased so as to be lower than the input voltage Vin. That is, as shown in FIG. 10, it is impossible to perform current limitation when the output voltage needs to be made lower than the input voltage Vin to limit the output current to a prescribed value.

The above problem can be avoided in insulated DC/DC converters using a transformer or the like. However, insulated DC/DC converters require a rectifier device having a high breakdown voltage and hence may suffer low conversion efficiency.

SUMMARY

The present invention provides a DC/DC converter capable of performing current limitation over a wide output voltage range.

According to one aspect of the present invention, there is provided a DC/DC converter that includes: a boost converter that boosts an input voltage in accordance with a first control signal; an insulated converter that converts an output of the boost converter in accordance with a second control signal; a current sensor that detects an output current of the insulated converter; a first controller that generates the first control signal based on an error between the output current detected by the current sensor and a first threshold value; and a second controller that generates the second control signal based on an error between the output current detected by the current sensor and a second threshold value that is larger than the first threshold value.

DETAILED DESCRIPTION

Embodiments will be hereinafter described with reference to the accompanying drawings.

Figure 1:
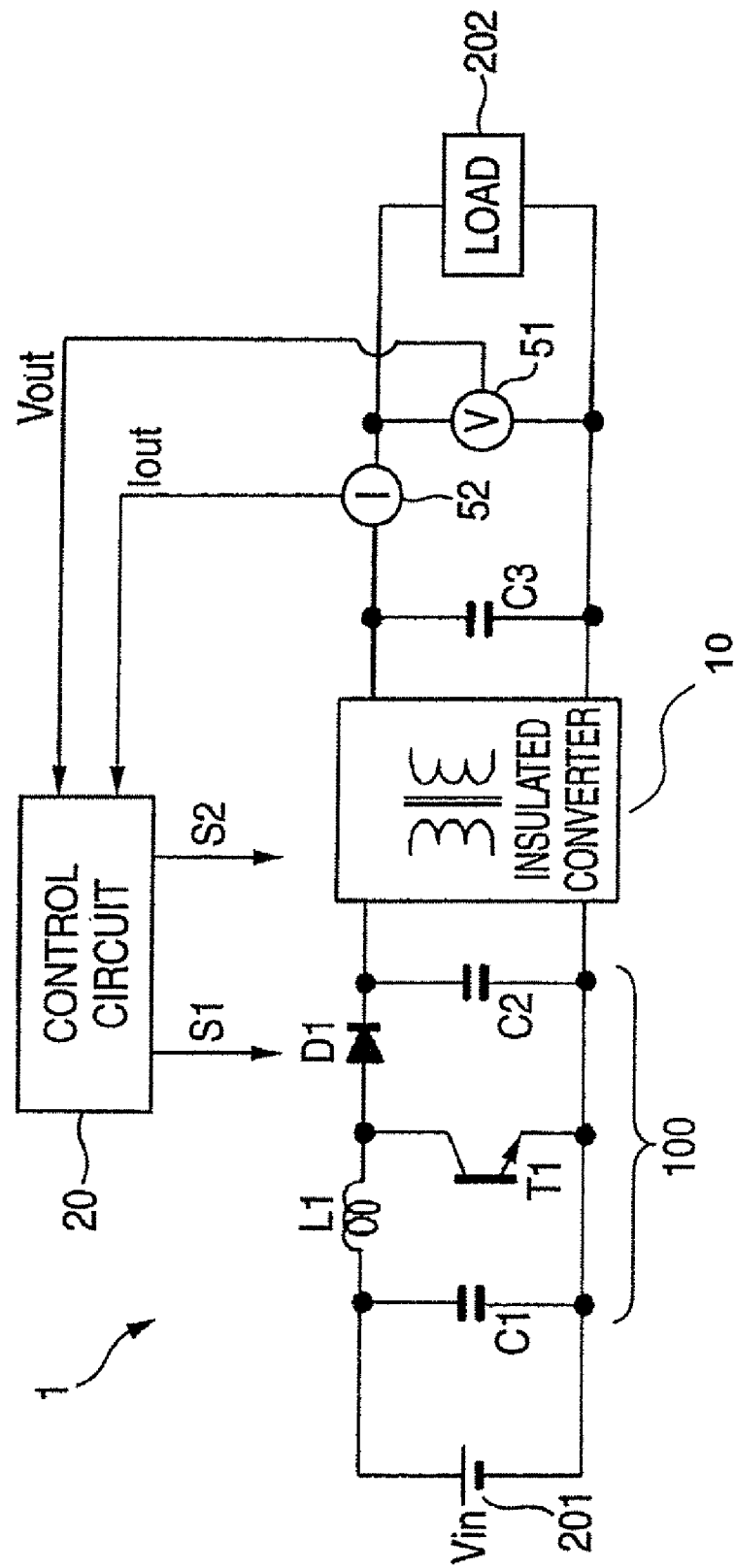
FIG. 1 shows a configuration of a DC/DC converter according to an embodiment.

FIG. 1 shows the configuration of a DC/DC converter according to an embodiment. The DC/DC converter 1 of FIG. 1 includes a boost converter 100 and an insulated converter 10 which is disposed downstream of the boost converter 100.

Figure 9:
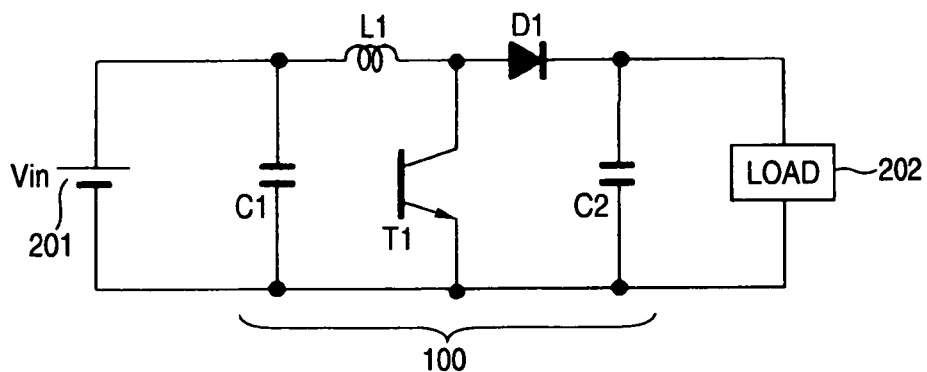
FIG. 9 shows a configuration of a main part of a conventional boost DC/DC converter.
Figure 10:
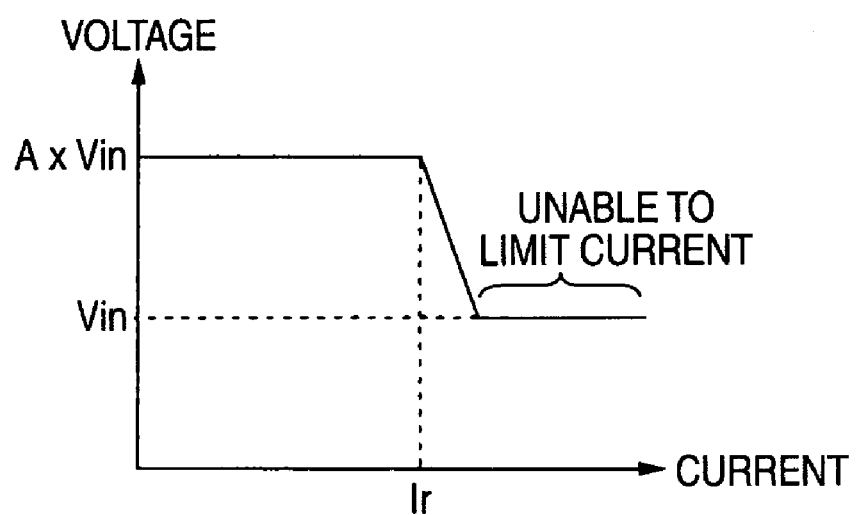
FIG. 10 is a graph showing an output characteristic of the boost DC/DC converter of FIG. 9.

The boost converter 100 is the same in configuration as that of FIG. 9, and hence is a DC/DC converter having an input capacitor C1, an inductor L1, a transistor T1, a diode D1, and an output capacitor C2. The boost converter 100 boosts an input voltage Vin supplied from a DC power source 201 according to a control signal S1 (first control signal) which is generated by a control circuit 20.

The insulated converter 10 is a DC/DC converter, and converts the output voltage of the boost converter 100 at an arbitrary voltage ratio according to a control signal S2 (second control signal) generated by the control circuit 20 and supplies a resulting voltage to a load 202. The output voltage of the insulated converter 10 is smoothed by an output capacitor C3. The insulated converter 10 includes a transformer or the like and hence its input end and output end are electrically insulated from each other.

A voltage sensor 51 detects an output voltage Vout of the DC/DC converter 1 (or a voltage applied to the load 202). A current sensor 52 detects an output current Iout of the DC/DC converter 1. The current sensor 52 may be incorporated in the insulated converter 10.

The control circuit 20 generates the above-mentioned control signals S1 and S2 on the basis of the output voltage Vout detected by the voltage sensor 51 and the output current Iout detected by the current sensor 52. The control circuit 20 provides a current limiting function of limiting the output current Iout to a prescribed threshold value or smaller. That is, the control circuit 20 limits the output current Iout utilizing the control signals S1 and S2 after the output current Iout has increased to the predetermined threshold value. If the output current Iout is smaller than or equal to the threshold value, the DC/DC converter 1 generates a voltage that is required by the load 202.

Figure 2A:
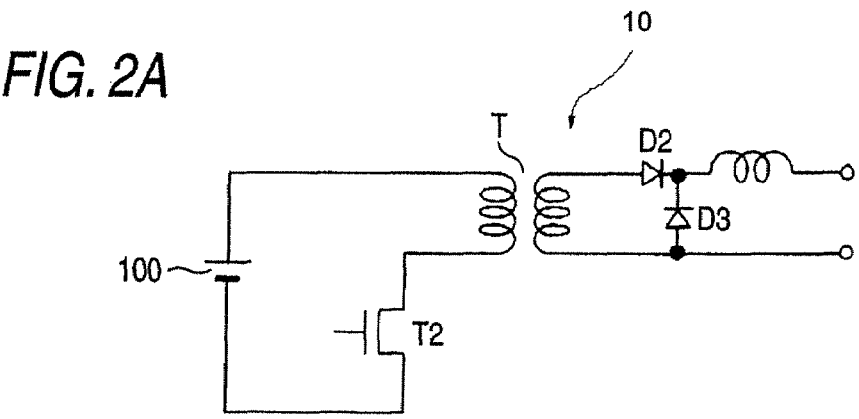
FIGS. 2A-2C show examples of an insulated converter.
Figure 2B:
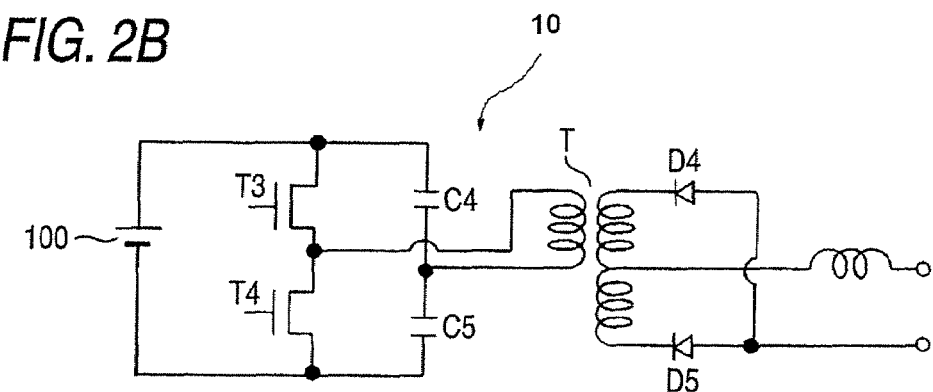
Figure 2C:
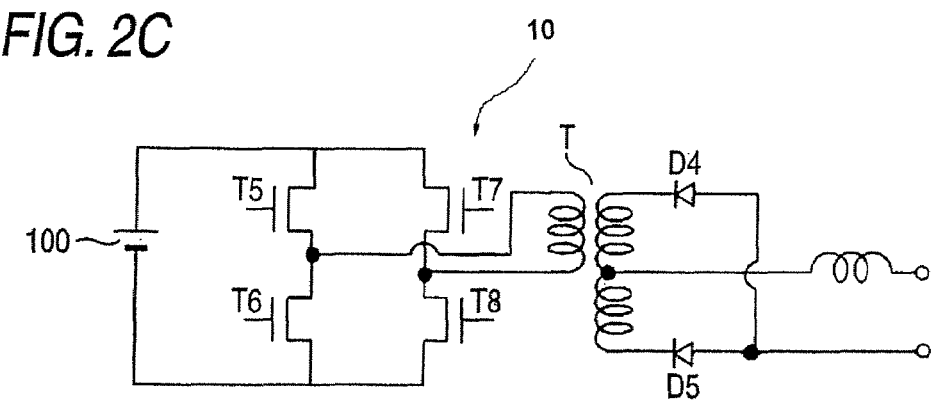

FIG. 2 shows examples of the insulated converter 10. The insulated converter 10 is not restricted in any ways and may have configurations as such shown in FIGS. 2A-2C.

The insulated converter shown in FIG. 2A is configured as a so-called forward type. A transistor T2 as a switching device is disposed on the primary side of a transformer T. The transistor T2 is controlled by the control signal S2. Diodes D2 and D3 as rectifier devices are provided on the secondary side of the transformer T.

The insulated converter shown in FIG. 2B is configured as a so-called half bridge type. A series connection of a pair of transistors T3 and T4 is disposed on the primary side of a transformer T. For example, the transistors T3 and T4 are controlled by the control signal S2 and its inverted signal. Capacitors C4 and C5 are provided parallel with the transistors T3 and T4. Diodes D4 and D5 as rectifier devices are provided on the secondary side of the transformer T.

The insulated converter shown in FIG. 2C is configured as a so-called full bridge type. A switch circuit consisting of transistors T5-T8 is disposed on the primary side of a transformer T. For example, the transistors T5-T8 are controlled by the control signal S2 and its inverted signal. The configuration of the secondary side of the transformer T is the same as that of the half-bridge-type insulated converter shown in FIG. 2B.

Figure 3:
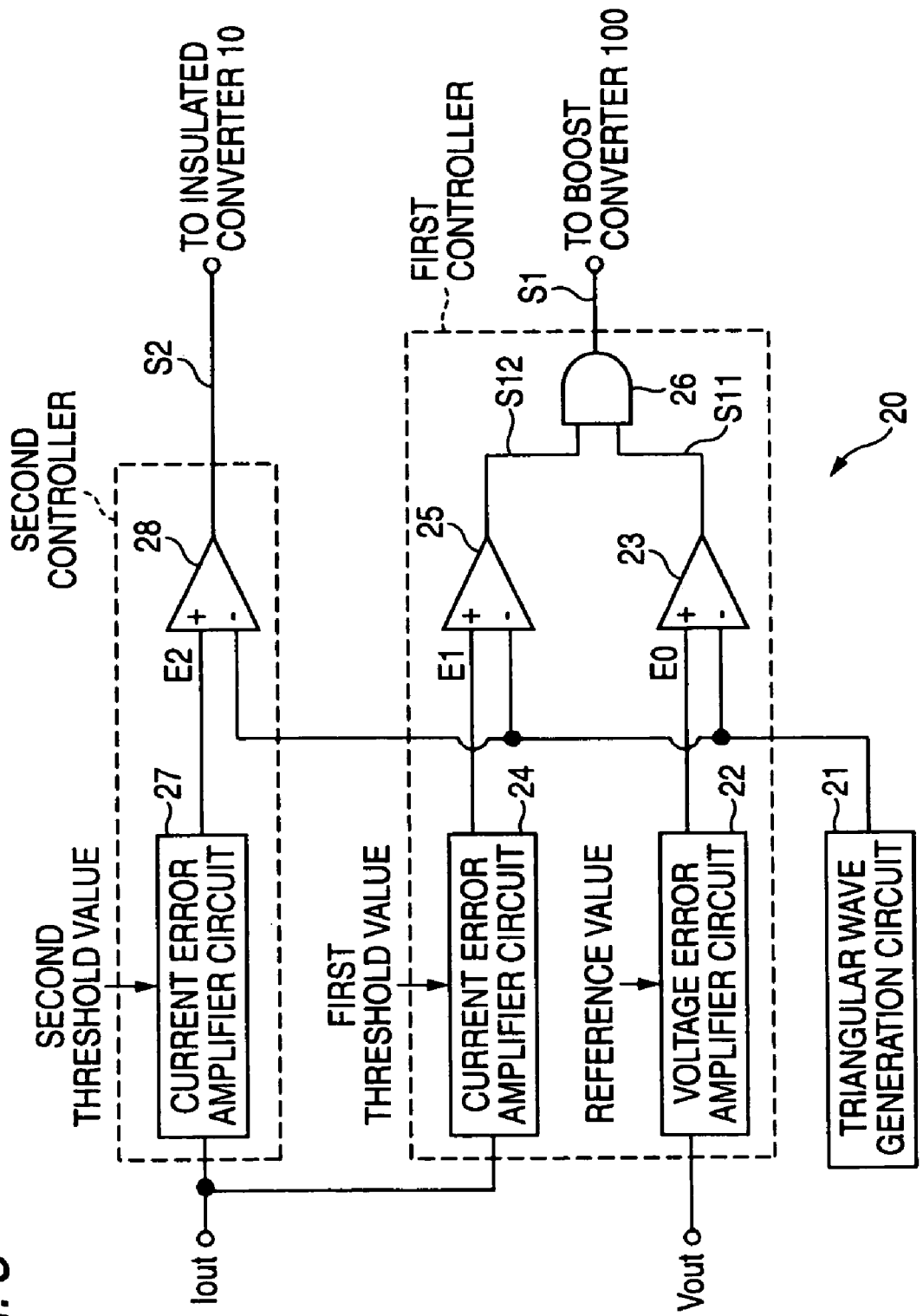
FIG. 3 shows the configuration of a control circuit.
Figure 4:
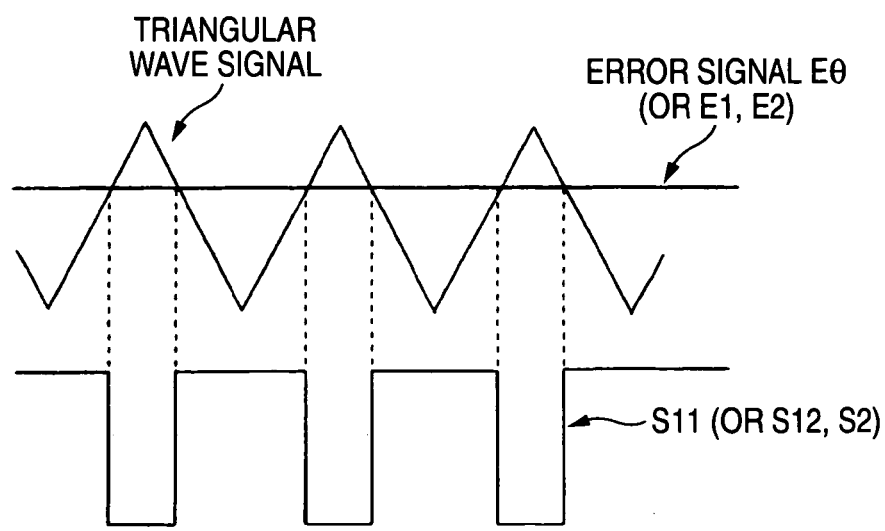
FIG. 4 illustrates a PWM signal which is generated in the control circuit.

FIG. 3 shows the configuration of the control circuit 20. Referring to FIG. 3, a triangular wave generation circuit 21 generates a triangular wave having a prescribed frequency. A voltage error amplifier circuit 22 outputs an error signal E0 which is produced by amplifying an error between a reference value and the output voltage Vout detected by the voltage sensor 51. The reference value may either be a fixed value that is determined in advance or vary dynamically as required by the load 202. For example, where the voltage that should be output to the load 202 is represented by A×Vin (A: a positive value that is greater than "1"), the reference value is set at a value corresponding to the value A×Vin. A comparator 23 generates a voltage control signal S11 on the basis of the triangular wave signal and the error signal E0. As shown in FIG. 4, the voltage control signal S11 as the output signal of the comparator 23 is at an L level when the potential of the triangular wave signal is higher than that of the error signal E0, and is at an H level when the potential of the triangular wave signal is lower than that of the error signal E0. That is, the voltage control signal S11 is a PWM signal whose duty cycle corresponds to the error signal E0.

A current error amplifier circuit 24 outputs an error signal E1 which is produced by amplifying an error between a first threshold value and the output current Iout detected by the current sensor 52. The first threshold value, which is a reference value to be used for limiting the output current Iout of the DC/DC converter 1 is a fixed value that is set in advance. A comparator 25 generates a current control signal S12 on the basis of the triangular wave signal and the error signal E1. Therefore, the current control signal S12 which is generated by the comparator 25 is a PWM signal whose duty cycle corresponds to the error signal E1. An AND circuit 26 outputs the AND of the voltage control signal S11 and the current control signal S12. The output signal of the AND circuit 26 is supplied to the boost converter 100 as the control signal S1.

Figure 5A:
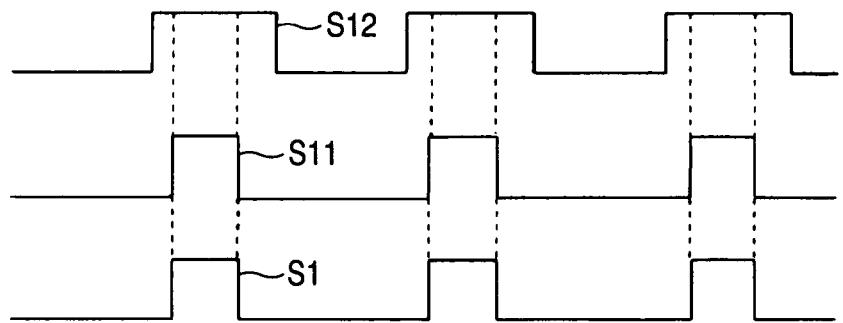
FIGS. 5A and 5B illustrate how to generate a control signal S1.
Figure 5B:
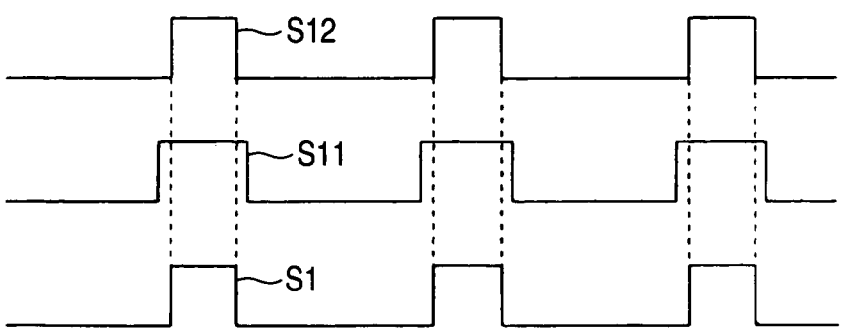

FIG. 5 illustrates how to generate the control signal S1. The control signal S1 is the AND of the voltage control signal S11 and the current control signal S12. Since the voltage control signal S11 and the current control signal S12 are generated by using the same triangular wave signal, the centers of corresponding H-level sections are timed with each other. Therefore, if the duty cycle of the voltage control signal S11 is smaller than that of the current control signal S12 as in the case of FIG. 5A, the control signal S1 becomes a PWM signal having the same duty cycle as the voltage control signal S11 has. On the other hand, if the duty cycle of the current control signal S12 is smaller than that of the voltage control signal S11 as in the case of FIG. 5B, the control signal S1 becomes a PWM signal having the same duty cycle as the current control signal S12 has.

A current error amplifier circuit 27 outputs an error signal E2 which is produced by amplifying an error between a second threshold value and the output current Iout detected by the current sensor 52. The second threshold value is larger than the first threshold value and is a fixed value that is set in advance. A comparator 28 generates the control signal S2 on the basis of the triangular wave signal and the error signal E2. The control signal S2 is supplied to the insulated converter 10. The control signal S2 is a PWM signal whose duty cycle corresponds to the error signal E2. However, if the output current Iout is smaller than or equal to the second threshold value, the duty cycle of the control signal S2 is kept at a constant value (e.g., 50%). In this case, the insulated converter 10 operates so as to have a constant conversion ratio (i.e., the ratio between the input voltage and the output voltage is constant).

As described above, the voltage error amplifier circuit 22, the current error amplifier circuit 24, the comparators 23 and 25, and the AND circuit 26 operate as circuits (first controller) for generating the control signal S1 (first control signal). The current error amplifier circuit 27 and the comparator 28 operate as circuits (second controller) for generating the control signal S2 (second control signal). The triangular wave generation circuit 21 is shared by the above two groups of circuits.

Figure 6:
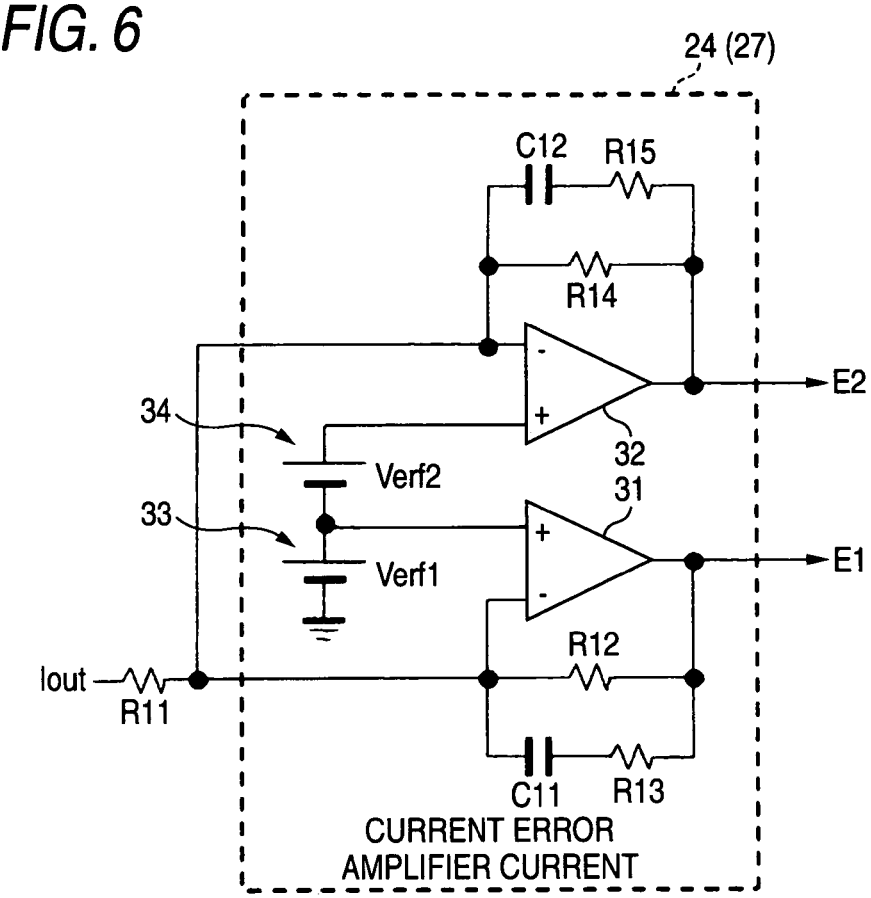
FIG. 6 shows an example of a current error amplifier circuit.

FIG. 6 shows an example of the current error amplifier circuits 24 and 27. As shown in FIG. 6, the current error amplifier circuit 24 includes an amplifier 31. The non-inverting input terminal of the amplifier 31 receives, from a power source 33, a reference voltage Vref1 which corresponds to the current limiting value (first threshold value) of the DC/DC converter 1. The inverting input terminal receives, via a resistor R11, a signal representing the output current Iout. The output of the amplifier 31 is connected to its inverting input terminal via a resistor R12, and a series connection of a capacitor C11 and a resistor R13 is connected to the resistor R12 in parallel. The amplifier 31 amplifies an error between the output current Iout and the reference voltage Vref1 and outputs a resulting signal as the error signal E1.

The current error amplifier circuit 27 includes an amplifier 32 and is similar in configuration to the current error amplifier circuit 24. Resistors R14 and R15 and a capacitor C12 are connected to the amplifier 32. However, the non-inverting terminal of the amplifier 32 receives, from power sources 33 and 34, a voltage Vref1+Vref2 which corresponds to the second threshold value. The reference voltage Vref2 is sufficiently lower than the reference voltage Vref1; for example, the reference voltage Vref2 is about 1% of the reference voltage Vref1. The amplifier 32 amplifies an error between the output current Iout and the voltage Vref1+Vref2 and outputs a resulting signal as the error signal E2.

Figure 7:
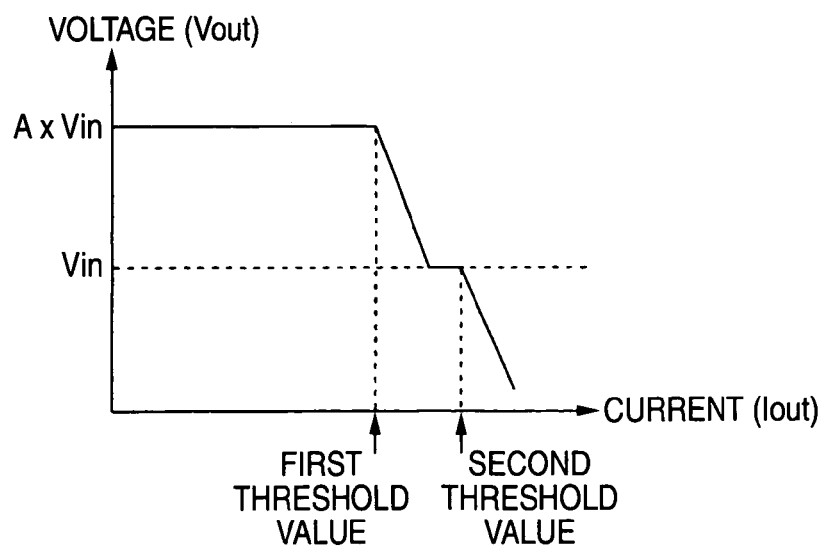
FIG. 7 is a graph showing an output characteristic of the DC/DC converter according to the embodiment.

Next, the operation of the DC/DC converter 1 will be described with reference to its output characteristic shown in FIG. 7. The horizontal axis and the vertical axis of the graph of FIG. 7 represent the output current Iout and the output voltage Vout of the DC/DC converter 1, respectively. The characteristic of FIG. 7 is drawn with an assumption that the voltage conversion ratio of the insulated converter 10 is 1:1 when the DC/DC converter 1 is not performing current limitation.

In an ordinary state (i.e., the output current Iout is smaller than or equal to the first threshold value and hence current limitation is not necessary), the DC/DC converter 1 operates in the voltage control mode. That is, the DC/DC converter 1 keeps the output voltage Vout at A×Vin, where A is a positive value that is larger than "1" and A×Vin is a voltage required by the load 202.

The control circuit 20 (including settings of the reference value, first threshold value, and second threshold value) is configured (designed) so as to operate in the following manner when the output current Iout is smaller than or equal to the first threshold value:

(1) The duty cycle of the voltage control signal S11 becomes smaller than that of the current control signal S12, and hence the duty cycle of the control signal S1 becomes equal to that of the voltage control signal S11.

(2) The duty cycle of the control signal S2 is constant (e.g., 50%).

Due to the configuration to operate as described in item (1) of above, the boost converter 100 does not perform a current limiting operation and operates so that the output voltage Vout becomes equal to A×Vin. Further, due to the configuration to operate as described in item (2) of above, the voltage conversion ratio of the insulated converter 10 is constant. Therefore, in this case, the output voltage of the boost converter 100 (i.e., the input voltage of the insulated converter 10) has a constant value. For example, if it is assumed that the voltage conversion ratio of the insulated converter 10 is 1:1 when the duty cycle of the control signal S2 is fixed at 50% (i.e., the turn ratio is 1:1), the output voltage of the boost converter 100 (i.e., the input voltage of the insulated converter 10) is fixed at A×Vin.

The error signal E1 decreases as the output current Iout increases. When the output current Iout has reached the first threshold value, switching is made from the voltage control mode to the current control mode and a current limiting operation is started. The control circuit 20 is configured (designed) so as to operate in the following manner after the output current Iout has reached the first threshold value:

(1) The duty cycle of the current control signal S12 becomes smaller than that of the voltage control signal Sl1, and hence the duty cycle of the control signal S1 becomes equal to that of the current control signal S12.

(2) The duty cycle of the control signal S2 is constant (e.g., 50%).

Due to the configuration to operate as item (1) of above, priority is given to the operation of limiting the output current Iout to the first threshold value over the operation of maintaining the output voltage Vout. The duty cycle of the current control signal S12 decreases to limit the output current Iout to the first threshold value, and the duty cycle of the control signal S1 decreases accordingly. As a result, the output voltage Vout decreases as shown in FIG. 7.

In FIG. 7, the slope of the output voltage Vout vs. output current Iout curve depends on the resistance of the resistor R12.

As described above, the output voltage Vout is decreased to limit the output current Iout. However, since the input end and the output end of the boost converter 100 is always connected to each other via the inductor L and the diode D1, the output voltage of the boost converter 100 cannot be made lower than the input voltage Vin. That is, if the load 202 becomes too light (e.g., occurrence of short-circuiting), there may occur a case that the output current Iout cannot be limited properly only by the control of the boost converter 100. In such a case, the output current Iout increases past the first threshold value.

If the output current Iout increases to such an extent as to exceed the second threshold value, the error signal E2 decreases and hence the duty cycle of the control signal S2 to be used for controlling the insulated converter 10 decreases. At this time, the input voltage of the insulated converter 10 (i.e., the output voltage of the boost converter 100) is fixed at Vin. Therefore, the output current Iout is controlled by the control signal S2. That is, when the duty cycle of the control signal S2 is decreased, the output current Iout comes to be limited by using the second threshold value. Further, when the duty cycle of the control signal S2 is decreased, the voltage conversion ratio of the insulated converter 10 decreases and hence the output voltage Vout becomes lower than the input voltage Vin.

As described above, in the DC/DC converter 1 according to the embodiment, in a range that the output voltage of the boost converter 100 is higher than the input voltage Vin, the current limiting function is realized by controlling the boost converter 100 while fixing the voltage conversion ratio of the insulated converter 10. In a situation that the output current Iout cannot be limited properly only by the boost converter 100, the output current Iout is limited to the prescribed value by varying the voltage conversion ratio of the insulated converter 10 while keeping the output voltage of the boost converter 100 equal to the input voltage Vin.

As described above, in an ordinary operation (non-current-limiting operation), the insulated converter 10 operates so as to have a constant voltage conversion ratio. Therefore, constant voltages are applied to the rectifier devices (e.g., the diodes D2-D5 shown in FIG. 2), which allow the rectifier devices of the insulated converter 10 to be parts having low breakdown voltages. Since rectifier devices having low breakdown voltages are generally of low losses, the loss of the insulated converter 10 is reduced and hence the conversion efficiency of the DC/DC converter 1 as a whole is increased.

Even a DC/DC converter that is formed only by a single-stage insulated converter can perform current limitation while making the output voltage lower than the input voltage. However, in this configuration, the voltage conversion ratio of the insulated converter is not constant and hence rectifier devices having high breakdown voltages are necessary. Therefore, the conversion efficiency of the DC/DC converter as a whole is lowered.

In the DC/DC converter 1 according to the embodiment, the input voltage Vin is boosted by the boost converter 100 which is disposed upstream of the insulated converter 10. The copper loss occurring in a DC/DC converter increases as the current flowing through the DC/DC converter increases. In other words, with an assumption that the DC/DC converter transmits the same power, the loss decreases as the voltage becomes higher. Therefore, the configuration in which the boost converter 100 is disposed upstream of the insulated converter 10 is low in loss and is increased in the conversion efficiency of the DC/DC converter 1 as a whole.

If the DC/DC converter 1 were such that the boost converter 100 and the insulated converter 10 performed current limiting operations simultaneously, the voltage conversion ratio of the insulated converter 10 would vary and hence there might occur a case that the output voltage of the boost converter 100 needs to be increased. For example, if the duty cycle of the control signal S2 to be used for controlling the insulated converter 10 varies from 50% to 25%, the upstream boost converter 100 is doubled. In this case, the input voltage of the insulated converter 10 necessarily increases. To avoid damaging the parts constituting the insulated converter 10, their breakdown voltages need to be increased. This leads to cost increase and efficiency reduction. In contrast, in the DC/DC converter 1 according to the embodiment, the second threshold value which is a reference value to be used for starting current limitation in the insulated converter 10 is larger than the first threshold value which is a reference value to be used for starting current limitation in the boost converter 100, and hence the boost converter 100 and the insulated converter 10 do not perform current limiting operations simultaneously. Therefore, it is not necessary to set the breakdown voltages of the parts constituting the insulated converter 10 unduly high.

Figure 8:
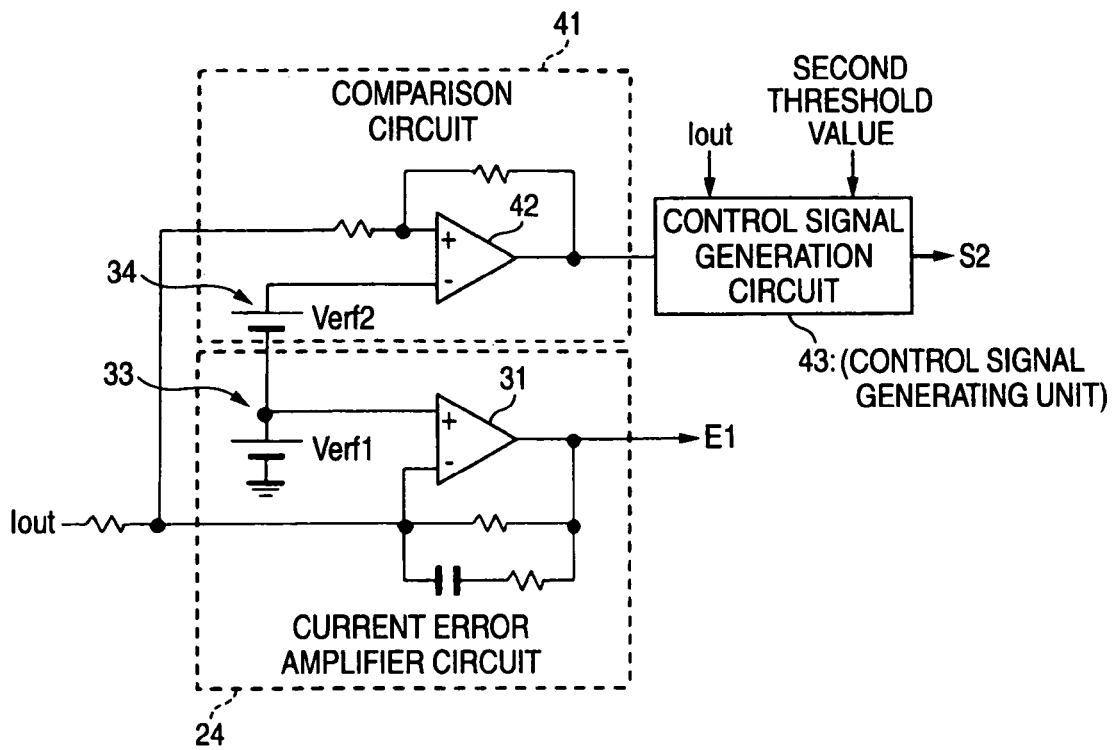
FIG. 8 shows the configuration of a part of a control circuit according to another embodiment.

FIG. 8 shows the configuration of a part of a control circuit according to another embodiment. In the configuration of FIG. 8, the current error amplifier circuit 24 including the amplifier 31 is the same as shown in FIG. 6.

A comparison circuit (comparing unit) 41, which includes a comparator 42, compares the output current Iout detected by the current sensor 52 with a second threshold value Vref1+Vref2. A control signal generation circuit 43 generates the control signal S2 in accordance with a comparison result of the comparison circuit 41. That is, if the detected output current Iout is smaller than or equal to the second threshold value, the control signal generation circuit 43 outputs a PWM signal having a constant duty cycle (e.g., 50%) so that the insulated converter 10 operates with a constant voltage conversion ratio. On the other hand, if the detected output current Iout is larger than the second threshold value, the control signal generation circuit 43 outputs a PWM signal having a small duty cycle to limit the output current Iout. For example, the control signal generation circuit 43 is implemented as a microcomputer which runs a program for providing the above function. The configuration of FIG. 8 is effective in implementing the control signal generation circuit 43 as an independent IC.

As described above with reference to the embodiments, there is provided a DC/DC converter including: a boost converter that boosts an input voltage in accordance with a first control signal; an insulated converter that converts an output of the boost converter in accordance with a second control signal; a current sensor that detects an output current of the insulated converter; a first controller that generates the first control signal based on an error between the output current detected by the current sensor and a first threshold value; and a second controller that generates the second control signal based on an error between the output current detected by the current sensor and a second threshold value that is larger than the first threshold value.

In the DC/DC converter thus configured, when it is necessary to limit the output current, the first the boost converter limits the output current according to the first control signal. If the output current cannot be limited properly only by the boost converter, the insulated converter limits the output current according to the second control signal. In general, to limit the output current of a DC/DC converter, it is necessary to lower the output voltage. Having the insulated converter downstream of the boost converter, the DC/DC converter according to the invention can limit the output current while making the output voltage lower than the input voltage.

The DC/DC converter may be configured that the DC/DC converter further includes a voltage sensor that detects an output voltage of the insulated converter, wherein the first controller generates the first control signal based on a voltage control signal and a current control signal, the voltage control signal being generated in accordance with an error between the output voltage detected by the voltage sensor and a reference value, and the current control signal being generated in accordance with an error between the output current detected by the current sensor and the first threshold value. According to this configuration, the DC/DC converter becomes possible to seamlessly switch between a voltage control mode in which the output voltage is kept at a value corresponding to the reference value and a current control mode in which the output current is limited on the basis of the first threshold value.

The DC/DC converter may be configured that the second controller generates the second control signal to cause the insulated converter to operate with a constant voltage conversion ratio when the output current detected by the current sensor is smaller than or equal to the second threshold value. According to this configuration, in an ordinary operation, the insulated converter operates so as to have the constant voltage conversion ratio. Therefore, the output voltage of the upstream boost converter does not become unduly high, that is, the input voltage of the insulated converter does not become unduly high. Therefore, the insulated converter can be constructed by using circuit elements having low breakdown voltages.

The DC/DC converter may be configured that the second controller includes: a comparing unit that compares the output current detected by the current sensor with the second threshold value; and a control signal generating unit that generates the second control signal to cause the insulated converter to operate with a constant voltage conversion ratio when the output current detected by the current sensor is smaller than or equal to the second threshold value, and generates the second control signal to limit the output current of the insulated converter when the output current detected by the current sensor is larger than the second threshold value. According to this configuration, the DC/DC converter becomes possible to implement the control signal generating unit for generating the second control signal as an IC that is independent of the other means.

The DC/DC converter according to the present invention performs current limitation over a wide output voltage range because the output voltage can be made lower than the input voltage in limiting the output current of a DC/DC converter to a prescribed value.

Although the present invention has been shown and described with reference to the embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A DC/DC converter comprising:
   a boost converter that boosts an input voltage in accordance with a first control signal;

an insulated converter that converts an output of the boost converter in accordance with a second control signal;

a current sensor that detects an output current of the insulated converter;

a first controller that generates the first control signal based on an error between the output current detected by the current sensor and a first threshold value; and a second controller that generates the second control signal based on an error between the output current detected by the current sensor and a second threshold value that is larger than the first threshold value, wherein the second controller comprises:

a comparing unit that compares the output current detected by the current sensor with the second threshold value; and a control signal generating unit that generates the second control signal to cause the insulated converter to operate with a constant voltage conversion ratio when the output current detected by the current sensor is smaller than or equal to the second threshold value, and generates the second control signal to limit the output current of the insulated converter when the output current detected by the current sensor is larger than the second threshold value.

2. The DC/DC converter according to claim 1, further comprises a voltage sensor that detects an output voltage of the insulated converter, wherein the first controller generates the first control signal based on a voltage control signal and a current control signal, the voltage control signal being generated in accordance with an error between the output voltage detected by the voltage sensor and a reference value, and the current control signal being generated in accordance with an error between the output current detected by the current sensor and the first threshold value.

* * * * *

UNITED STATES PATENT AND TRADEMARK OFFICE
CERTIFICATE OF CORRECTION

PATENT NO. : 7,336,057 B2  
APPLICATION NO. : 11/412818  
DATED : February 26, 2008  
INVENTOR(S) : Nobuo Hirabayashi It is certified that error appears in the above-identified patent and that said Letters Patent is hereby corrected as shown below:

Column 3, line 8, please delete "is not restricted in any ways" and insert therefore -- is not restricted in any way --;

Column 3, line 9, please delete "as such shown" and insert therefore -- such as shown --;

Column 3, line 41, please delete "or vary dynamically" and insert therefore -- or may vary dynamically --;

Column 4, line 14, please delete "control signal S11 has." and insert therefore -- control signal S11. --;

Column 5, lines 33 and 36, please delete "of above," and insert therefore -- above, --;

Column 7, lines 64-65, please delete "the first the boost converter" and insert therefore -- the boost converter --;

Column 8, line 19, please delete "becomes possible to seamlessly switch" and insert therefore -- can seamlessly switch --; and Column 8, line 49, please delete "becomes possible to implement the control signal" and insert therefore -- can implement the control signal --.

Signed and Sealed this

Twenty-third Day of June, 2009

JOHN DOLL  
*Acting Director of the United States Patent and Trademark Office*